Figure 1:
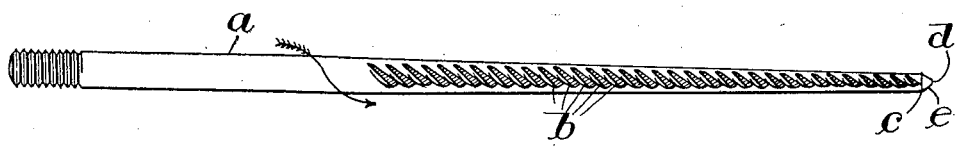

No. 762,606. PATENTED JUNE 14, 1904.
J. F. APPLEBY.
COTTON PICKING FINGER.
APPLICATION FILED DEC. 14, 1903.
NO MODEL.

Witnesses:
C. H. Crawford
Leon Stroh

Inventor:-
John F. Appleby
by G. L. Cragg
His Attorney

No. 762,606.

Patented June 14, 1904.

UNITED STATES PATENT OFFICE.

JOHN F. APPLEBY, OF CHICAGO, ILLINOIS.

COTTON-PICKING FINGER.

SPECIFICATION forming part of Letters Patent No. 762,606, dated June 14, 1904.

Application filed December 14, 1903. Serial No. 185,089. (No model.)

*To all whom it may concern:*

Be it known that I, JOHN F. APPLEBY, a citizen of the United States, residing at Chicago, in the county of Cook and State of Illinois, have invented a certain new and useful Improvement in Cotton-Picking Fingers, of which the following is a full, clear, concise, and exact description, reference being had to the accompanying drawings, forming a part of this specification.

My invention relates to cotton-picking fingers, and has for its object the provision of an improved construction of such fingers whereby the machine-work thereon may be greatly reduced and which at the same time will prove a highly efficient instrumentality in removing cotton from cotton-plants in the field.

As is well known to those skilled in the art there is one class of cotton-picking machines wherein a plurality of vertically-disposed shafts are provided, each for rotating or driving a set of cotton-picking fingers that are thrust into the plants and withdrawn therefrom as the machine proceeds over the field. These cotton-picking fingers having in one type of machine been in the form of tapered members longitudinally grooved, picking-teeth being provided upon the fingers, the grooves in the fingers margining the teeth and forming in association therewith picking-barbs or lint-gathering bars. This construction of the picking-fingers is somewhat expensive and is not on all occasions as efficient as desirable. The teeth upon the fingers of the prior art are inclined to the axis of the fingers at an angle, say, of forty-five degrees, the teeth sloping from the base of the finger toward its apex. In the fingers of the prior art the lower ends of the teeth of each set are margined with a groove to afford at these lower ends picking-barbs which are the advance portions of the teeth as the fingers are rotated and as they are thrust into the bush, the teeth being advanced into the bush by the combined fact of the rotation of the fingers and the bodily thrusting of the fingers into the bushes. By means of my invention I am enabled to provide these picking-barbs upon the lower ends of the teeth without the necessity of grooving the fingers.

Generally speaking, my invention comprises in its preferred embodiment a picking-finger preferably tapered as far as is practicable without making the fingers too weak at their points, these fingers being preferably convex in every cross-section before the formation of the teeth thereon. In accordance with my invention teeth are struck up from each finger, preferably at a very acute angle to the axis of the finger, the cutting tool or element being so operated as to not only strike up the major portion of each tooth, but also to form in the lower end of each tooth (that end nearer the point of the finger than the base thereof) a picking-barb, which in the preferred construction is a gradual continuation of the upper marginal portion of each tooth, which continuation terminates in a sharp point that slightly overhangs all of the fingers to constitute a lodging or engaging place for the cotton-lint. The upper end of each tooth (that end nearer the base of the finger than the point thereof) is preferably unprovided with any barb formation, the upper marginal or ridge portion of each tooth gradually sloping down to and merging with the normal periphery of the finger. By this construction a barb of much better formation is secured than with the prior construction and one which not only will gather cotton-lint with great efficacy, but from which the cotton-lint may readily be stripped, as the upper ends of the teeth, being free of barbs, readily permit the stripping of the lint. The fingers of the prior art have been faulty in their operation upon frequent occasions, as will be readily understood by those practically skilled in this art, as such fingers when subject to the action of the stripper would not always readily release the lint.

I will explain my invention more fully by reference to the accompanying drawings, illustrating the preferred embodiment of the invention, and in which—

Figure 2:
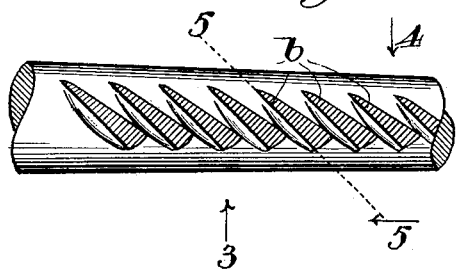
Figure 3:
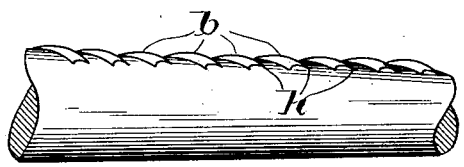
Figure 4:
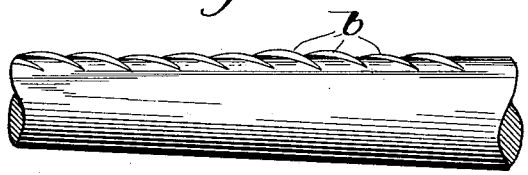
Figure 5:
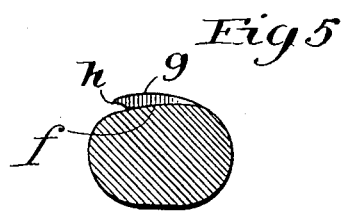

Figure 1 is a plan view of a cotton-picking finger constructed in accordance with my invention. Fig. 2 is a plan view of a portion of the finger on an enlarged scale, showing a group of teeth. Fig. 3 is another view of the portion shown in Fig. 2 in the direction of arrow 3. Fig. 4 is a view of the portion shown in Fig. 2 in the direction of arrow 4. Fig. 5 is a sectional view on line 5 5 of Fig. 2.

Like features are indicated by similar characters of reference throughout the different figures.

The base $a$ of the finger is preferably of uniform diameter at the threaded portion and for a distance from the threaded portion somewhat in excess of the length of the threaded portion to enable the finger to have suitable bearing within the machine and to facilitate the proper action of the stripping-fingers. Slightly before the serrations $b$ in the finger are reached the tapering of the finger is commenced, this tapering being gradual from the point of commencement to the apex or point $c$ of the finger. The point of the finger is desirably made slightly blunt at $d$ to prevent injury to the plant and is sharply tapered for a short distance at $e$ to facilitate penetration of the finger within the plant. The serrations or teeth $b$ are preferably confined to a space along the finger having straight boundary-lines extending longitudinally of the finger; but this arrangement is not essential to all embodiments of my invention, and, in fact, one advantage secured by means of the invention is that such close regularity and uniform arrangement of the teeth is not as essential in the construction of my invention as with the fingers of the prior art, thereby cheapening the cost of the labor. The teeth also are preferably inclined at uniform angles with respect to the axis of the finger. The finger is desirably of circular cross-section at every point, except of course where the teeth are struck up, the latter being without the general cross-sections of the body portion. Where the teeth are struck up, the bases $f$ of the teeth are below the periphery of the finger. These base-lines $f$ are preferably straight, while the upper ridges $g$ of the teeth are preferably curved, the upper ends of each ridge gradually approaching the normal periphery of the finger and merging therewith, so as to be free of barbs, so that the finger may readily have the lint stripped therefrom after the finger has left the cotton-plant. The lower end of each tooth, however, on the contrary, is not gradually merged with the periphery of the finger, but rather overhangs the same a slight distance in the form of picking point or barb $h$, this point overhanging a slight distance, which distance, however, is sufficient in the practical operation of the fingers to grasp the lint and strip it from the plant.

A great advantage of my construction, wherein the barbs project in an angular plane to the axis of the finger and overhang the periphery thereof, resides in the fact that when the finger is projected into the bush the barbs project substantially in the plane of axial rotation of the finger and also substantially within the plane of bodily movement of the finger when the same is being projected into and passing through the cotton-plant, resulting in a most effective action upon the open bolls, which constructions of the prior art are incapable of effecting.

It will be observed that the barbs, while generally projecting in planes oblique to the axis of the picking-finger and the length of the picking-finger, also project in planes that are substantially tangential to the curvature of the finger.

It is to be understood, of course, that when the finger is rotated to engage the cotton-lint it is rotated in the direction indicated by the arrow in Fig. 1. After the finger has been withdrawn from the plant its rotation may, if desired, be stopped, whereafter the stripping-fingers may remove the lint, as is well understood.

I have not deemed it necessary to illustrate the embodiment of the finger of my invention in an organized cotton-picking machine, as such a disposition of the finger will be readily understood by those skilled in the art.

I believe it to be broadly new with me to provide a picking-finger whose teeth are located without the general periphery or contour of the finger, so as to be always in position to engage with the cotton-bolls. Particularly do I believe it to be new with me to have such teeth overhanging convex or uncut-away portions of the body of the picking-finger.

I do not wish to be limited to the precise construction shown; but,

Having thus described my invention, I claim as new and desire to secure by Letters Patent—

1. A cotton-picking finger of solid construction tapering from a base portion toward its apex having its body convex, and provided with integrally-formed teeth thereon and inclined with respect to the axis of the finger, the upper edges or ridges of the teeth merging gradually with the periphery of the finger at the ends of the teeth nearer the base of the finger and being without and directly overhanging the convex periphery of the finger at the ends of the teeth nearer the apex of the finger to constitute picking-barbs, said barbs projecting in planes angular to the axis of said finger, substantially as described.

2. A cotton-picking finger of solid construction tapering from a base portion toward its apex having its body convex, and provided with teeth integrally formed thereon and inclined with respect to the axis of the finger, the upper edge or ridge of each tooth merging gradually with the periphery of the finger at one end and being without and directly overhanging the convex periphery of the finger at the other end of each tooth to constitute a barb, said barbs projecting in planes angular to the axis of said finger, substantially as described.

3. A cotton-picking finger of solid construction tapering from a base portion toward its apex having its body convex, and provided with teeth integrally formed thereon, said teeth being without and directly overhanging the convex periphery of the finger to constitute picking-barbs, said barbs projecting in planes oblique to the axis and length of said finger, and substantially tangential to the curvature of the finger, substantially as described.

4. A cotton-picking finger of solid construction having its body convex, and provided with integrally-formed teeth thereon and inclined with respect to the axis of the finger, the upper edges or ridges of the teeth merging gradually with the periphery of the finger at the ends of the teeth nearer the base of the finger and being without and directly overhanging the convex periphery of the finger at the ends of the teeth nearer the apex of the finger to constitute picking-barbs, said barbs projecting in planes angular to the axis of said finger, substantially as described.

5. A cotton-picking finger of solid construction having its body convex, and provided with teeth integrally formed thereon and inclined with respect to the axis of the finger, the upper edge or ridge of each tooth merging gradually with the periphery of the finger at one end and being without and directly overhanging the convex periphery of the finger at the other end of each tooth to constitute barbs, said barbs projecting in planes angular to the axis of said finger, substantially as described.

6. A cotton-picking finger of solid construction having its body convex, and provided with teeth integrally formed thereon, said teeth being without and directly overhanging the convex periphery of the finger to constitute picking-barbs, said barbs projecting in planes oblique to the axis and length of said finger, and substantially tangential to the curvature of the finger, substantially as described.

7. A cotton-picking finger of solid construction tapering from a base portion toward its apex having its body convex, and provided with integrally-formed teeth thereon and inclined with respect to the axis of the finger, the upper edges or ridges of the teeth merging gradually with the periphery of the finger at the ends of the teeth nearer the base of the finger and being without and directly overhanging the convex periphery of the finger at the ends of the teeth nearer the apex of the finger to constitute picking-barbs, said barbs projecting in planes oblique to the length of said finger and substantially tangential to the curvature of the finger, substantially as described.

8. A cotton-picking finger of solid construction tapering from a base portion toward its apex having its body convex, and provided with teeth integrally formed thereon and inclined with respect to the axis of the finger, the upper edge or ridge of each tooth merging gradually with the periphery of the finger at one end and being without and directly overhanging the convex periphery of the finger at the other end of each tooth to constitute a barb, said barbs projecting in planes oblique to the length of said finger and substantially tangential to the curvature of the finger, substantially as described.

9. A cotton-picking finger of solid construction having its body convex, and provided with integrally-formed teeth thereon and inclined with respect to the axis of the finger, the upper edges or ridges of the teeth merging gradually with the periphery of the finger at the ends of the teeth nearer the base of the finger and being without and directly overhanging the convex periphery of the finger at the ends of the teeth nearer the apex of the finger to constitute picking-barbs, said barbs projecting in planes oblique to the length of said finger and substantially tangential to the curvature of the finger, substantially as described.

10. A cotton-picking finger of solid construction having its body convex, and provided with teeth integrally formed thereon and inclined with respect to the axis of the finger, the upper edge or ridge of each tooth merging gradually with the periphery of the finger at one end and being without and directly overhanging the convex periphery of the finger at the other end of each tooth to constitute barbs, said barbs projecting in planes oblique to the length of said finger and substantially tangential to the curvature of the finger, substantially as described.

In witness whereof I hereunto subscribe my name this 10th day of December, A. D. 1903.

JOHN F. APPLEBY.

Witnesses:
G. L. CRAGG,
A. H. CRAWFORD.